United States Patent [19]
Wouters et al.

[11] Patent Number: 5,268,399
[45] Date of Patent: Dec. 7, 1993

[54] RESIN EMULSIONS

[75] Inventors: Guy Wouters; Jules Callebaut, both of Brussels, Belgium; Andre Lepert, Allouville Bellefosse, France

[73] Assignee: Exxon Chemical Patents Inc., Linden, N.J.

[21] Appl. No.: 65,792

[22] Filed: Jun. 24, 1987

[51] Int. Cl.$^5$ .............................................. C08J 3/00
[52] U.S. Cl. .................................. 523/336; 524/458; 524/460; 524/570; 524/801; 522/84
[58] Field of Search ................ 523/336; 524/801, 460, 524/458, 570

[56] References Cited

U.S. PATENT DOCUMENTS

| | | | |
|---|---|---|---|
| 3,951,896 | 4/1976 | Shimizu et al. | 524/460 |
| 4,077,930 | 3/1978 | Lim et al. | 524/801 |
| 4,670,504 | 6/1987 | Cardenas et al. | 524/525 |

FOREIGN PATENT DOCUMENTS

| | | | |
|---|---|---|---|
| 128673 | 12/1984 | European Pat. Off. | |
| 0123156 | 9/1979 | Japan | 524/458 |
| 957959 | 5/1964 | United Kingdom. | |

*Primary Examiner*—John C. Bleutge
*Assistant Examiner*—Mark Sweet
*Attorney, Agent, or Firm*—M. E. Wilson; T. D. Simmons; J. F. Hunt

[57] ABSTRACT

Resin emulsions are prepared by forming an emulsion of an aqueous solution of an unsaturated material reactive with the resin in the liquid resin, causing the material and the resin to react and adding sufficient water to invert the emulsion to form an emulsion of the reacted resin in water to produce emulsions with improved mechanical stability useful as tackifiers in water-based pressure-sensitive adhesive coating materials in high speed coating lines giving reduced deposits and extended coating times.

21 Claims, No Drawings

RESIN EMULSIONS

This invention relates to a process for the production of resin emulsions and the products thereof, in particular, emulsions having improved mechanical stability. This is particularly useful where emulsions which are mechanically stable are required as with those applied in coating lines, particularly adhesive coating lines where emulsion breakdown causes deposits on the apparatus, leading to lines in the coating requiring frequent shut down of the line for cleaning.

Polar modification of hydrocarbon tackifying resins can lead to modification of the resin properties such as improved compatibility with polar polymers, ease of emulsification, emulsion stability and adhesion on polar surfaces.

Grafting unsaturated anhydrides, acids, etc. on resins via a thermal condensation process is described in, for example, U.S. Pat. Nos. 3,379,663 and 3,953,407. These processes necessitate long heating periods at elevated temperature prior to emulsification. Free radical grafting has also been suggested in U.S. Pat. Nos. 3,279,925, 3,005,800 and 3,161,620, although these patents are not concerned with the production of emulsions.

We have now discovered a method of making modified resin emulsions which are stable and are compatible with polar polymers.

According to this invention, a resin emulsion is produced by a process which comprises forming an emulsion of an aqueous solution of an unsaturated material reactive with the resin in the liquid resin, causing the material and the resin to react and adding sufficient water to invert the emulsion to form an emulsion of the reacted resin in water.

Many different resins can be used in the process of the invention but hydrocarbon resins are preferred, the resins used preferably contain some unsaturation as is the case with the majority of commercially available resins. Examples of suitable resins are petroleum resins, (aliphatic, aromatic or aliphatic/aromatic), resins made by the copolymerisation of pure aromatic monomers (e.g. styrene, methyl styrene or vinyl toluene) with olefins and/or diolefins and derivatives thereof, rosin derivatives, polyterpenes or derivatives thereof or coumarone-indene resins.

Petroleum resins may be obtained by polymerising fractions having a boiling point from $-15°$ C. to $410°$ C. at atmospheric pressure formed by the thermal cracking of petroleum feedstock. The fractions may be polymerised thermally or in the presence of a catalyst, for example, a Friedel-Crafts catalyst such as $AlCl_3$.

Usually the petroleum feedstock, e.g. light naphtha, heavy naphtha, kerosene, gas oil, vacuum gas oil and comprising $C_5$ olefins and diolefins, $C_6$ olefins and diolefins or a mixture of $C_5$ and $C_6$ olefins and diolefins is cracked in the presence of steam and the preferred temperature is between $600°$ and $900°$ C. The products from this cracking usually have a boiling point of $-15°$ C. to $280°$ C. and may comprise about 30 to 60% olefins, 10 to 30% diolefins, 20 to 50% aromatics and 5 to 20% paraffins and naphthalenes.

Preferably the product is subjected to fractionation to remove $C_2$ to $C_4$ light ends, thermal soaking and distillation to remove hydrocarbons such as cyclic diolefins including cyclopentadiene and methyl cyclopentadiene as dimers.

After thermal soaking and distillation one obtains an overhead naphtha which usually boils at temperatures from $30°$ to $110°$ C., e.g. $30°$ to $80°$ C. This overhead naphtha comprises mainly $C_5$ diolefins such as isoprene and 1,3 cis- and transpentadienes, $C_5$ to $C_6$ monoolefins and aromatics, for example benzene. Generally the overhead naphthas have the following composition but the exact composition obviously depends on the nature of the petroleum feedstock which is subjected to steam-cracking.

|  | % by Weight |
|---|---|
| Total paraffins | 1.0 to 41.4 |
| Total diolefins | 35.5 to 14.5 |
| Total olefins | 33.5 to 13.0 |
| Total aromatics | 30.0 to 31.0 |
| Isoprene | 16.5 to 6.5 |
| Pentadiene 1,3 | 14.5 to 4.5 |
| Cyclopentadiene | 1.0 to 2.5 |

Alternatively, the feed may be a C9 feed which is a mixture of olefinic aromatics such as styrene, vinyl toluene, $\alpha$- methyl styrene and indene or mixtures of C5 and C9 feeds may be polymerised. Alternatively, mixtures of C5 feeds and pure aromatic monomers mentioned above, and/or terpenes may be polymerised. A particularly suitable resin is an aliphatic-aromatic resin obtained by polymerising mixtures of olefins (essentially C5 and C6 olefins and diolefins) and aromatic monomers, for example, styrene, $\alpha$- methyl styrene and vinyl toluene.

If thermal polymerisation takes place, the fraction, i.e. overhead naphtha, is polymerised usually at a temperature of between $200°$ C. and $280°$ C. for 1 to 8 hours. If it is polymerised in the presence of Friedel-Crafts catalyst, the polymerisation temperature can vary, for example, between $-80°$ C. and $120°$ C., preferably between $-10°$ C. and $80°$ C., for $\frac{1}{4}$ to 2 hours.

Friedel-Crafts catalysts such as aluminium trichloride, aluminium trichloride—aromatic hydrocarbon complexes, aluminium tribromide, boron trifluoride, boron trifluoride-phenol complex, titanium chloride, ethyl aluminium chloride, and ferric chloride for example may be used.

These catalysts may be used in the solid, liquid or gaseous state. Usually, the amount of catalyst which is used is between 0.05 and 3.0 wt. %, preferably 0.1 to 1.5 wt. %, based on the weight of the material to be polymerised.

After polymerisation the residual catalyst may be removed, for example, by washing with an aqueous solution of alkali, ammonia or sodium carbonate or by the addition of an alcohol such as methanol and subsequent filtration.

The final resin may then be stripped of unreacted hydrocarbons "raffinate" rich in benzene and/or paraffins (unreacted olefins) and low molecular weight oily oligomers by steam stripping or vacuum distillation. The finished product usually has a softening point of from $0°$ to $250°$ C., especially $30°$ to $140°$ C.

If desired, hydrogenated products of these resins can also be used. Hydrogenation can be performed at a reaction temperature of $150°$ C. to $250°$ C., preferably $200°$ to $250°$ C., a hydrogen reaction pressure of 30 to 250 bar, preferably 50 to 100 bar, using a catalyst such as nickel or Raney nickel supported on a diatomaceous earth, alumina, silica gel or pumice carrier, in a solvent such as an aliphatic saturated hydrocarbon, for example hexane or heptane.

In general, the preferred resins are aliphatic petroleum resins obtained by polymerising a fraction having a boiling point of $-15°$ C. to $60°$ C. at atmospheric pressure using a Friedel-Crafts catalyst.

The hydrocarbon resins are usually solid at ambient temperature and usually have an average molecular weight of 500 to 3000, preferably 700 to 2000. However, liquid or semi-liquid resins can be used.

In the process of the invention unless the resin is already liquid it has to be rendered liquid e.g. the resin is melted or dissolved in a solvent. If the resin is melted it may only be necessary to heat the resin to just above its melting point and it is not desirable to overheat the resin. For petroleum resins the melting point is usually between $0°$ C. and $250°$ C. Alternatively, the resin may be dissolved in a suitable solvent, for example, a paraffin such as hexane, heptane, nonane, octane or mixtures thereof, an aromatic hydrocarbon such as benzene, toluene, xylene or an olefin such as heptene or nonene.

The unsaturated material reactive with the resin is preferably one that provides a polar function in the resin subsequent to reaction which provides improved emulsion stability. Examples of suitable materials are unsaturated acids, anhydrides and amines and their salts.

The preferred materials are unsaturated organic carboxylates or organic sulphonates and suitable unsaturated organic carboxylates include the Group I or Group II metal or ammonium salts of unsaturated carboxylic or sulphonic acids, e.g. the sodium or potassium salts. Suitable unsaturated carboxylic acids are acrylic acid, methacrylic acid, acrylic or methacrylic acid dimer, oleic acid, cis- and trans-crotonic acids and the unsaturated dicarboxylic acids such as maleic, fumaric, itaconic and citraconic acids and their hemi esters. Suitable unsaturated sulphonic acids include vinyl sulphonic acid, allyl sulphonic acid and styrene sulphonic acid.

The unsaturated material is dissolved in water to form an aqueous solution which should be a sufficiently concentrated solution so that the amount of water present in the resin/salt mixture is such that a water-in-oil emulsion is formed. We prefer that no more than 20%, more preferably not more than 16 wt. % of water based on the weight of resin be present.

The aqueous solution is added to the liquid resin, preferably with stirring, more preferably with high shear agitation to ensure effective distribution of the aqueous solution throughout the liquid resin so that a water-in-oil emulsion is formed. The amount of unsaturated material added is preferably equivalent to 0.1 to 10, more preferably 0.5 to 3 wt. %, based on the weight of resin. Preferably an emulsifier is also added to the liquid resin, e.g. with the aqueous solution of carboxylate or sulphonate to facilitate the formation of the water-in-oil emulsion. The emulsifier should be an anionic or non-ionic surface-active agent or a mixture thereof.

Suitable anionic surface-active agents include alkaryl sulphonates, e.g. sodium or calcium alkyl benzene sulphonates; fatty alcohol sulphates, e.g. sodium lauryl sulphate; phosphate esters, e.g. the sodium salts of mono- and di-esters of orthophosphoric acid; esters of sulphosuccinic acid; the sodium salts of sulphated monoglycerides; and sulphonates or sulpho succinates of alkyl polyoxyalkylene oxide condensates or of alkyl phenon polyalkylene oxide condensates, e.g. the ammonium salt of nonylphenol polyethylene oxide sulphonic acid.

Suitable non-ionic surface-active agents include polyethylene oxides, e.g. fatty alcohols or alkyl phenols reacted with ethylene oxide, such as oleyl alcohol reacted with 15 moles of ethylene oxide; polyalkylene oxide block copolymers in which the alkylene oxide blocks are for example those of ethylene oxide and propylene oxide; carboxylic amides i.e. the condensation products of fatty acids and hydroxyalky amines, e.g. diethanolamine condensates and polyoxyethylene fatty acid amides, and carboxylic acid esters, e.g. glycerol esters, polyoxyethylene esters and ethoxylated and glycol esters of fatty acids.

If used, the amount of emulsifier which is added is preferably between 0.1 and 10 percent by weight based on the weight of resin, for example, between 0.5 and 5 percent by weight.

Having obtained a water-in-oil emulsion, the unsaturated material is caused to react with the resin. We prefer the reaction be caused by the introduction of a free radical initiator into the emulsion. Suitable free radical initiators include organic peroxy compounds, for example, t-butyl peroxy-2-ethyl hexanoate, benzoyl peroxide, dicumyl peroxide and azo compounds, for example symmetric azonitriles such as 2,2'azobis (2-methylpropionitrile), 2,2'-azo-bis (2,4 dimethyl valero nitrile and unsymmetric azonitriles such as 2-(tert-butylazo)- 2-methylpropionitrile, water-soluble initiators, e.g. ammonium, sodium or potassium persulphates or redox systems, i.e. hydroperoxides or persulphates in conjunction with sodium bisulphite or sodium formaldehyde sulphoxylate.

The amount of free radical initator which is added is not critical but preferably 0.0001 to 0.05 per cent, for example, 0.001 to 0.01 percent, by weight based on the weight of resin is sufficient.

Alternatively, the reaction can be initiated by radiation.

Whilst the nature of the reaction is uncertain, it is believed that with free radical initiation it may be grafting. We have, however, found that when the reaction is caused by radical initiation in order for the reaction to take place at a reasonable rate it is preferable for the reaction mixture to be heated, for example, to a temperature of about $70°$ to $100°$ C. However, the temperature is to some extent dependent on the resin softening point (if melted) and the half life time of any free radical initiator which is used. When using redox systems heating may not be required. The time for the reaction to be completed can vary, but usually it is complete after 2 hours and often after about 1 hour.

Before adding water or an aqueous solution, the reaction mixture can be cooled e.g. to a temperature of about $50°$ C. to $95°$ C. Thereafter water or an aqueous solution is added until the emulsion inverts from a water-in-oil emulsion to an oil-in-water emulsion and one normally adds not more than 50 wt. %, preferably not more than 15 wt. % of water based on the weight of resin. Where the material reacted with the resin is an acid or an anhydride, an aqueous solution of a neutralising base may conveniently be used.

If the resin has been rendered liquid by the use of a solvent, it is at this stage after the inversion of the emulsion that the solvent is removed. This can be achieved by distillation, but other methods which can be used include steam stripping.

In a preferred embodiment, the process comprises:

(i) adding to a liquid unsaturated resin an aqueous solution of an unsaturated organic carboxylate or an unsaturated organic sulphonate, the amount of water being preferably not more than 16 wt. % based on the weight of resin;

(ii) introducing to the water-in-oil emulsion which has thereby been formed a free radical initiator to effect grafting of the unsaturated salt on the resin backbone, and if necessary raising the temperature of the reaction mixture for grafting to occur;

(iii) adding a sufficient amount of water or of an aqueous solution to the emulsion for the water-in-oil emulsion to invert into a stable oil-in-water emulsion.

In a further embodiment, the resin emulsion is produced by:

(i) introducing into a liquid resin 0.1 to 10 wt. % of an unsaturated material reactive with the resin (ii) introducing a free radical initiator to effect reaction of the unsaturated material with the resin and if necessary, raising the temperature of the reaction mixture for reaction to occur (iii) adding a neutralising agent and water, the amount of water being preferably not more than 20 wt. % based on the weight of resin whence a water-in-oil emulsion is formed; and (iv) adding more water or an aqueous solution until the water-in-oil emulsion inverts into a stable oil-in-water emulsion This embodiment of the process is primarily of value where the amount of reactive material is relatively low resulting in a modified resin which itself is difficult to emulsify. The materials useful in this embodiment are the same as those described previously for the invention and the resin is either liquid at ambient temperature or it has been rendered liquid e.g. by melting or dissolving in a solvent. Suitable unsaturated materials are the carboxylic acids and sulphonic acids and their salts mentioned previously and the preferred amount is 0.5 to 5 wt. % based on the weight of resin.

Thereafter radical initator is added to effect reaction of the unsaturated material and the unsaturated resin. In the next step water and optionally a neutralising agent are added preferably together with an emulsifier. The neutralising agent which is used when the reactive material is acidic is preferably added as an aqueous solution of the neutralising agent which can for example be an alkali metal hydroxide or alkaline earth metal oxide or hydroxide, for instance sodium hydroxide, potassium hydroxide, calcium oxide, calcium hydroxide or ammonium hydroxide. The amount of water added to the reaction mixture containing the grafted polymer is preferably not more than 20 wt. %, more preferably not more than 16 wt. % by weight based on the weight of resin.

At this stage a water-in-oil emulsion is formed. To obtain the desired product more water or an aqueous solution is added until the water-in-oil emulsion inverts to a stable oil-in-water emulsion. Thereafter any solvent which has been used to render the resin liquid is removed.

In both the principal process and alternative embodiment of the invention optionally an unsaturated monomer is also dispersed in the liquid resin. Examples of unsaturated monomers that may be used include unsaturated carboxylic acids, for example, acrylic acid, methacrylic acid, maleic acid, crotonic acid, fumaric acid, itaconic acid and citraconic acid. Other suitable monomers include unsaturated carboxylic esters, e.g. mono- and dialkyl methacrylates, alkyl crotonates, hydroxy alkyl acrylates and methacrylates.

The amount of unsaturated monomer which is added will depend on how much grafting is required and the molecular weight of the monomer. These monomers are generally added to increase functionality of the hydrocarbon resin and eventually they modify the compatibility of the resin with the polymers.

The oil-in-water hydrocarbon resin emulsions produced by this invention usually have a small particle size, generally below 1 micron and preferably below 0.5 micron as measured using a Coulter N4 submicron particle size analyser, have high mechanical shear stability and compatibility with polar polymers. They are useful as tackifiers of adhesive polymer emulsions and are extremely useful in emulsion adhesive systems applied on high speed coating lines resulting in reduced emulsion breakdown, fewer deposits and longer coating runs. Such adhesive polymer emulsions include acrylic polymers, styrene-butatiene rubber (SBR) carboxylated SBR, polyvinyl acetate and vinyl acetate-ethylene copolymers. The resin emulsions can also be mixed with other polar emulsions such as acrylic resins to make pressure-sensitive adhesives.

The invention is illustrated by the following examples, the first two being by way of comparison.

EXAMPLE 1

200 g of an unsaturated aliphatic/aromatic petroleum resin with a 30° C. softening point and being a copolymer of a feed which is predominantly $C_5$ olefins and diolefins and 20 wt. % of styrene were melted at 55° C. and then mixed with 26.7 g of Fenopon EP-110 surfactant (30 wt. % active ingredient in water), the surfactant being the ammonium salt of nonyl phenol-polyethylene oxide sulphónic acid (9 mole ethylene oxide).

After dispersion of the surfactant, water was slowly added at 55° C. with stirring until the emulsion inverted from a water-in-oil emulsion into an oil-in-water emulsion. Further water was added and the solids content was adjusted to 55 wt. %.

The resulting resin emulsion had a particle size greater than 1 micron and separated into two phases after two days storage at ambient temperature.

EXAMPLE 2

Example 1 was repeated but using instead of 26.7 g of Fenopon EP-110 8 g of Atlas G3300 which is a calcium alkyl benzene sulphonate.

The resulting emulsion had a particle size of less than 1 micron and showed no phase separation after six months' storage at ambient temperature. However, when its mechanical stability was evaluated it was found that the emulsion broke down at a shear rate of 4000 $sec^{-1}$ as determined in a Haake Rotoviscometer.

EXAMPLE 3

200 g of the resin used in Example 1 were melted at 55° C. and mixed with a solution of 5 g of sodium crotonate in 26.7 g of Fenopon EP-110.

After the solution had emulsified into a water-in-oil emulsion, a solution of 0.01 g of tert-butylperoxy-2-ethylhexanoate in 2 g dioctyl phthalate (as dispersing agent for the free radical initiator) was added at 55° C. with stirring and under a nitrogen blanket. After dispersion of the free radical initiator, the temperature was raised to 90° C. and the mixture was allowed to react under stirring for one hour.

The mixture was then cooled to 55° C. and warm water was added to the system until the emulsion inverted into an oil-in-water emulsion and further water was added to provide a 55 wt. % solids emulsion.

The resulting emulsion had a particle size of 0.3 micron and showed no phase separation after six months' storage at ambient temperature. Its mechanical stability was evaluated and this showed that the emulsion was stable within the shear rates limits of the Haake Rotoviscometer (10,000 sec$^{-1}$).

EXAMPLE 4

200 g of the resin used in Example 1 were melted at 70° C. and mixed with 4 g of methacrylic acid and 0.01 g of t-butylphenoxy-2-ethyl hexanoate in 2 g dioctyl phthalate under a nitrogen blanket.

The mixture was heated at 90° C. for 1 hour and at 120° C. for 30 minutes. It was then cooled down to 55° C. The acid was then neutralised by adding to the molten resin a concentrated solution of KOH.

The resin was then mixed with 26.7 g of Fenopon EP-115 (ammonium salt of nonyl phenol polyethylene oxide sulphonic acid, 15 moles ethylene oxide, 30% active ingredient in water). After dispersion of the surfactant, water was slowly added at 55° C. with stirring until the emulsion inverted into an oil-in-water emulsion and further water was added to provide a 55 wt. % soldis emulsion.

The resulting emulsion had a similar particle size and stability to the emulsion of Example 3.

The modified resin emulsion of Examples 3 and 4 were evaluated in two commercial acrylic pressure-sensitive adhesive (PSA) polymer latices and showed an improvement in the loop tack on polyethylene and ball tack when used with Acronal V205 and an overall improvement when used with Acronal 85D.

TABLE

Evaluation of Resin Emulsions of
Examples 3 and 4 as Acrylic PSA Latex Tackifier
(100 phr acrylic; 50 phr resin)

| | Acronal V 205 | | | Acronal 85 D | | |
|---|---|---|---|---|---|---|
| | | Tackified | | | Tackified | |
| | As Such | Ex. 3 | Ex. 4 | As Such | Ex. 3 | Ex. 4 |
| Peel stregnth (g.cm$^{-1}$) (PSTC-1)* | 700 | 660 | 300 | 330 | 460 | 390 |
| Loop tack (N/inch) on metal (steel) (FTM-9)* | 12.8 | 10.5 | 8.5 | 9.3 | 8.6 | 9.0 |
| On polyethylene (FTM-9)* | 5.0 | 7.0 | 7.5 | 3.0 | 6.0 | 7.5 |
| Ball tack (cm) (PSTC-7)* | 3.5 | 2.5 | 2.0 | 7.0 | 5.0 | 4.0 |
| Shear (hrs) (PSTC-7)* | 2.0 | 0.4 | 0.1 | >100.0 | 2.5 | 6.1 |

Test methods used

We claim:

1. A process for producing a resin emulsion comprising the steps of:
    i) mixing a liquid resin with an aqueous solution of an unsaturated organic material to form a water in resin emulsion wherein the liquid resin is selected from the group of a molten resin and a resin dissolved in a solvent;
    ii) adding a free radical initiator to the water in resin emulsion to initiate a reaction in which the unsaturated organic material is grafted to the resin; and
    iii) adding water to the water in resin emulsion in which the unsaturated organic material is grafted to the resin in an amount sufficient to cause the water in resin emulsion to invert to a resin in water emulsion.

2. A process for producing a resin emulsion comprising the steps of:
    i) mixing a liquid resin with an unsaturated organic material to form a mixture in which the unsaturated organic material is present in an amount from 0.1 to 10 weight percent of the liquid resin wherein the liquid resin is selected from the group of a molten resin and a resin dissolved in a solvent;
    ii) adding a free radical initiator to the mixture of the liquid resin and unsaturated organic material to initiate a reaction in which the unsaturated organic material is grafted to the resin;
    iii) adding water to the mixture in which the unsaturated organic material is grafted to the resin in a sufficient amount to form a water in resin emulsion; and
    iv) adding water to the water in resin emulsion in an amount sufficient to cause the water in resin emulsion to invert to a resin in water emulsion.

3. A process according to claim 2 wherein the liquid resin is a petroleum resin.

4. A process according to claim 1 wherein the grafting reaction between the resin and the unsaturated organic material is initiated by radiation.

5. The process according to claim 1 wherein the grafting reaction between the unsaturated organic material and the resin is initiated by radiation.

6. A process according to claim 1 wherein the unsaturated material reactive with the resin is an organic carboxylate.

7. A process according to claim 6 in which the organic carboxylate is a Group I or Group II metal or ammonium salt of an unsaturated carboxylic acid.

8. A process according to claim 7 wherein the carboxylic acid is acrylic acid, methacrylic acid or cis- or trans- crotonic acid.

9. A process according to claim 1 wherein the amount of water provided by the aqueous solution is not more than 20 wt % based on the weight of resin.

10. A process according to claim 9 wherein the amount of water added is no more than 16 wt % based on the weight of resin.

11. A process according to claim 6 wherein the amount of aqueous solution of unsaturated material reactive with the resin is sufficient to provide 0.1 to 10 wt % of carboxylate or sulphonate based on the weight of resin.

12. A process according to claim 2 in which the unsaturated reactive material is an unsaturated carboxylic acid or anhydride.

13. A process according to claim 2 in which a neutralising agent is introduced with the water in step (iii).

14. A process according to claim 1 wherein the carboxylic acid is acrylic acid, methacrylic acid, or cis- or trans- crotonic acid.

15. A process according to claim 2 wherein the amount of water added in step (iii) is not more than 20 wt. % based on the weight of resin.

16. A process according to claim 15 in which the amount of water added is not more than 16 wt. % based on the resin.

17. A process according to claim 1 wherein the resin is a petroleum resin.

18. A process according to claim 1 wherein the resin has been melted before the unsaturated reactive material is added thereto.

19. A process according to claim 1 wherein an emulsifier is added to the liquid resin.

20. A process according to claim 1 wherein an unsaturated monomer is dispersed in the resin after it has been rendered liquid.

21. A process according to claim 20 wherein the unsaturated monomer is an ester of an unsaturated carboxylic acid.

* * * * *